(12) United States Patent
Gergis

(10) Patent No.: US 11,111,987 B2
(45) Date of Patent: Sep. 7, 2021

(54) COUNTERFORCE DRIVE-BELT SYSTEM

(71) Applicant: Mobile Climate Control, Corp., Goshen, IN (US)

(72) Inventor: Adel Gergis, York, PA (US)

(73) Assignee: Mobile Climate Control, Corp., Goshen, IN (US)

( * ) Notice: Subject to any disclaimer, the term of this patent is extended or adjusted under 35 U.S.C. 154(b) by 420 days.

(21) Appl. No.: 16/155,430

(22) Filed: Oct. 9, 2018

(65) Prior Publication Data

US 2019/0107180 A1    Apr. 11, 2019

Related U.S. Application Data

(60) Provisional application No. 62/570,363, filed on Oct. 10, 2017.

(51) Int. Cl.
| F16H 7/14 | (2006.01) |
| F16H 7/08 | (2006.01) |
| F16H 7/02 | (2006.01) |

(52) U.S. Cl.
CPC ............... *F16H 7/14* (2013.01); *F16H 7/02* (2013.01); *F16H 2007/0806* (2013.01); *F16H 2007/0865* (2013.01); *F16H 2007/0891* (2013.01)

(58) Field of Classification Search
CPC ...... F16H 7/14; F16H 7/02; F16H 2007/0806; F16H 2007/0865; B60K 5/1208; B60K 5/1216; F02B 77/081; F02B 77/04; F02B 75/06

USPC ....... 474/138, 135; 123/195 A, 192.1, 198 R
See application file for complete search history.

(56) References Cited

U.S. PATENT DOCUMENTS

| 3,641,830 | A | * | 2/1972 | Stofer | F16H 7/1254 |
| | | | | | 474/122 |
| 5,002,518 | A | * | 3/1991 | Pennatto | F16H 7/10 |
| | | | | | 474/113 |
| 5,026,330 | A | * | 6/1991 | Zermati | F16H 7/1236 |
| | | | | | 474/110 |
| 6,422,964 | B1 | * | 7/2002 | Rointru | F16H 7/1218 |
| | | | | | 474/133 |
| 7,194,994 | B1 | * | 3/2007 | Chisenhall | F02B 67/04 |
| | | | | | 123/195 A |
| 2010/0273591 | A1 | * | 10/2010 | Graf | F16H 7/08 |
| | | | | | 474/138 |
| 2011/0065539 | A1 | * | 3/2011 | Robbins | F16H 7/1281 |
| | | | | | 474/135 |

* cited by examiner

*Primary Examiner* — Michael R Mansen
*Assistant Examiner* — Mark K Buse
(74) *Attorney, Agent, or Firm* — Barnes & Thornburg LLP

(57) ABSTRACT

An engine system includes a frame, a prime mover, and drive-belt system. The prime mover is coupled with the frame for movement therewith. The drive-belt system includes a wheel configured to be driven by the prime mover about a rotation axis and to transmit energy to an accessory unit.

18 Claims, 5 Drawing Sheets

FIG. 3

COUNTERFORCE DRIVE-BELT SYSTEM

CROSS REFERENCE TO RELATED APPLICATIONS

This application claims priority to and the benefit of U.S. Provisional Patent Application No. 62/570,363, filed 10 Oct. 2017, the disclosure of which is now expressly incorporated herein by reference.

FIELD OF THE DISCLOSURE

The present disclosure relates generally to drive-belt systems adapted for use in an engine system, and more specifically to drive-belt systems adapted to transmit power in an engine system.

BACKGROUND

Vehicles and industrial facilities may include one or more engine systems adapted to power the vehicles or machines in the facilities. Many engine systems include a prime mover configured to rotate a shaft about a rotation axis to generate rotational movement. Engine systems may further include accessory units adapted to assist the operation of the prime mover and to provide supplemental features, such as lighting and ventilation, for the vehicles or facilities.

Some accessory units are driven mechanically by the prime mover and other accessory units are driven electrically. Electrically driven accessory units may be driven by an alternator or a motor-generator that is powered by the prime mover. A band may be used to transmit rotational movement from the shaft included in the prime mover to an accessory unit or an alternator. A tension force is applied to the band to obtain reliable and efficient power transfer.

The tension imparts a force on the rotating shaft and the magnitude of the force may be a function of the number of accessory units and/or the load demanded by the accessory units. As such, an increase in the load demanded from the accessory units and/or an increase in the number of accessory units powered by the prime mover may increase the force applied to the shaft.

SUMMARY

The present disclosure may comprise one or more of the following features and combinations thereof.

A drive-belt system for use with an engine may include a crank shaft pulley and a bias-member assembly. The crankshaft pulley may be configured to be coupled with a crankshaft of an engine for rotation with the crankshaft about a rotation axis. The bias-member assembly may be coupled with the crankshaft pulley and the bias-member assembly and may be configured to apply a radial force to the crankshaft pulley relative to the rotation axis.

In illustrative embodiments, the drive-belt system further includes a belt arranged around the crankshaft pulley. The belt is configured to apply a radial tension force to the crankshaft pulley.

In some embodiments, the bias-member assembly includes at least one of an air cylinder, a rubber spring, a hydraulic spring, a magnetic spring, and a compression spring. In illustrative embodiments, the drive-belt system further includes a controller configured to vary the radial force applied to the crankshaft pulley by the bias-member assembly.

An engine system may include a frame, a prime mover, an accessory unit, and a drive-belt system. The prime mover may be coupled with the frame for movement therewith. The prime mover may include a crankshaft configured to rotate about a rotation axis. The drive-belt system may include a crankshaft pulley coupled with the crankshaft for rotation with the crankshaft about the rotation axis, a belt coupled to the crankshaft pulley and the accessory unit, and a bias-member assembly coupled with the crankshaft pulley and with the frame. The crankshaft pulley may apply a tension force to the crankshaft pulley in a first radial direction relative to the rotation axis and the bias-member assembly may apply a counterforce to the crankshaft pulley in a second radial direction relative to the rotation axis.

In illustrative embodiments, the tension force and the counterforce apply a radial net force to the crankshaft pulley. The radial net force is less than the tension force.

In some embodiments, the radial net force is less than about 3 kilonewtons. In illustrative embodiments, the first radial direction and the second radial direction define an angle alpha therebetween and the angle alpha is greater than about 90 degrees.

In illustrative embodiments, the bias-member assembly includes at least one of an air cylinder, a rubber spring, a hydraulic spring, a magnetic spring, and a compression spring. In illustrative embodiments, the drive-belt system further includes a controller configured to vary the counterforce applied to the crankshaft pulley by the bias-member assembly.

In illustrative embodiments, the crankshaft pulley may include a guide shaft that extends along the rotation axis and a wheel body configured to rotate relative to the guide shaft. The bias-member assembly may include a bracket coupled with the guide shaft and a bias member coupled with the bracket and the frame.

In illustrative embodiments, the bracket may include a first wall and a second wall that extends away from the first wall such that the bracket is L-shaped. The first wall may be coupled with the guide shaft and the second wall may be coupled with the bias member.

An engine assembly may include a frame, a prime mover, and a drive-belt system. The prime mover may be coupled with the frame for movement therewith. The prime mover may include a shaft driven to rotate about a rotation axis. The drive-belt system may include a wheel and a bias-member assembly. The wheel may be coupled with the shaft for rotation with the shaft about the rotation axis. The bias-member assembly may be coupled with the wheel and with the frame. The bias-member assembly may apply a counterforce to the wheel and the shaft in a first radial direction relative to the rotation axis.

In illustrative embodiments, the drive-belt system includes a band coupled with the wheel. The band applies a tension force to the wheel and the shaft in a second radial direction relative to the rotation axis. The second radial direction is different than the first radial direction.

In illustrative embodiments, the wheel includes a pulley and the band includes a belt arranged around the pulley. In some embodiments, the wheel includes a sprocket and the band includes a chain arranged around the sprocket.

In illustrative embodiments, the tension force and the counterforce apply a radial net force to the wheel. The radial net force is less than the tension force.

In illustrative embodiments, the first radial direction and the second radial direction define an angle alpha therebetween. The angle alpha is greater than about 90 degrees.

A method may include a number of steps. The method may include providing a frame, a prime mover having a crankshaft configured to rotate about a rotation axis, and a drive-belt system including a wheel and a bias-member assembly, coupling the prime mover with the frame for movement therewith, coupling the wheel with the crankshaft for rotation with the crankshaft about the rotation axis, and coupling the bias-member assembly with the wheel and with the frame to cause the bias-member assembly to apply a first radial force to the wheel.

In some embodiments, the method further includes applying a second radial force to the wheel to cause a radial net force applied to the wheel to be less than each of the first radial force and the second radial force. In some embodiments, the method further includes applying a second radial force to the wheel such that the first radial force and the second radial force define an angle therebetween and the angle is greater than 90 degrees.

In some embodiments, the method further includes varying the first radial force applied to the wheel. In some embodiments, the bias-member assembly includes at least one of an air cylinder, a rubber spring, a hydraulic spring, a magnetic spring, and a compression spring.

These and other features of the present disclosure will become more apparent from the following description of the illustrative embodiments.

DETAILED DESCRIPTION OF THE DRAWINGS

Figure 1:
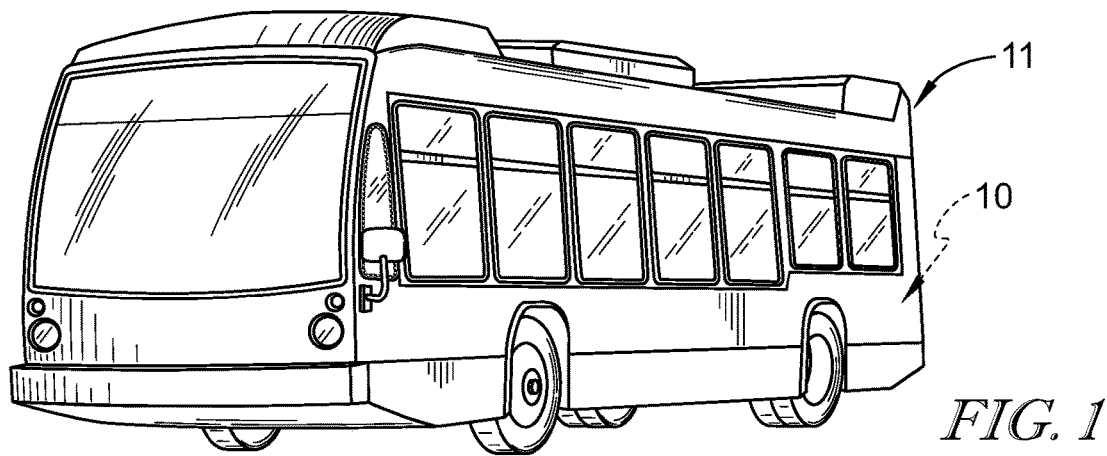
FIG. 1 is a perspective view of a bus having an engine system that includes a drive-belt system in accordance with the present disclosure.

For the purposes of promoting an understanding of the principles of the disclosure, reference will now be made to a number of illustrative embodiments illustrated in the drawings and specific language will be used to describe the same.

Figure 2:
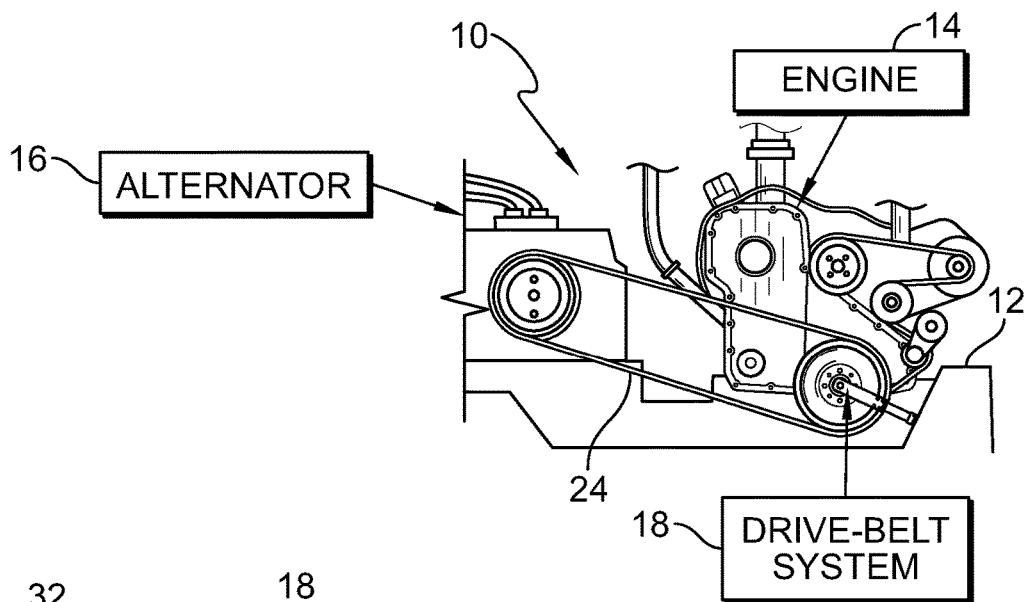
FIG. 2 is a diagrammatic view of the engine system included in the bus of FIG. 1 showing that the engine system includes an engine coupled to a frame, an alternator configured to be driven by rotational energy of the engine, and the drive-belt system, the drive-belt system coupled to the frame and including a pulley coupled to a crankshaft of the engine and a belt coupled to the pulley and the alternator.

A drive-belt system 18 in accordance with the present disclosure is included in an engine system 10 of a vehicle 11 such as, for example, a bus 11 as shown in FIGS. 1 and 2. In other embodiments, the engine system 10 is used in other powered systems, both mobile and stationary. The engine system 10 includes a frame 12, an engine 14, an alternator 16, and the drive-belt system 18 as shown in FIG. 2. The frame 12 couples the engine 14 with the vehicle 11. The engine 14 generates rotational motion that is used to move the vehicle 11. The alternator 16 provides electric energy for the engine 14 and the vehicle 11. The drive-belt system 18 transmits a portion of the rotational motion from the engine 14 to the alternator 16 to drive the alternator 16.

Figure 3:
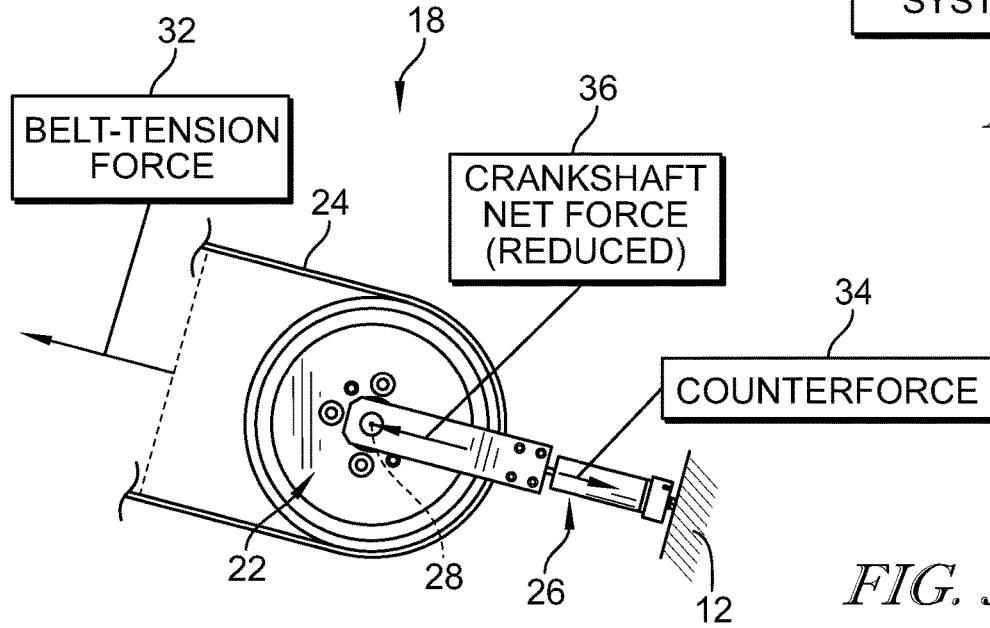
FIG. 3 is a diagrammatic view of the drive-belt system of FIG. 2 showing that the drive-belt system includes the pulley, the belt, and a bias-member assembly, the belt applies a belt-tension force to the pulley and the bias-member assembly applies a counterforce to the pulley to reduce a net force applied to the crank shaft of the engine.
Figure 4:
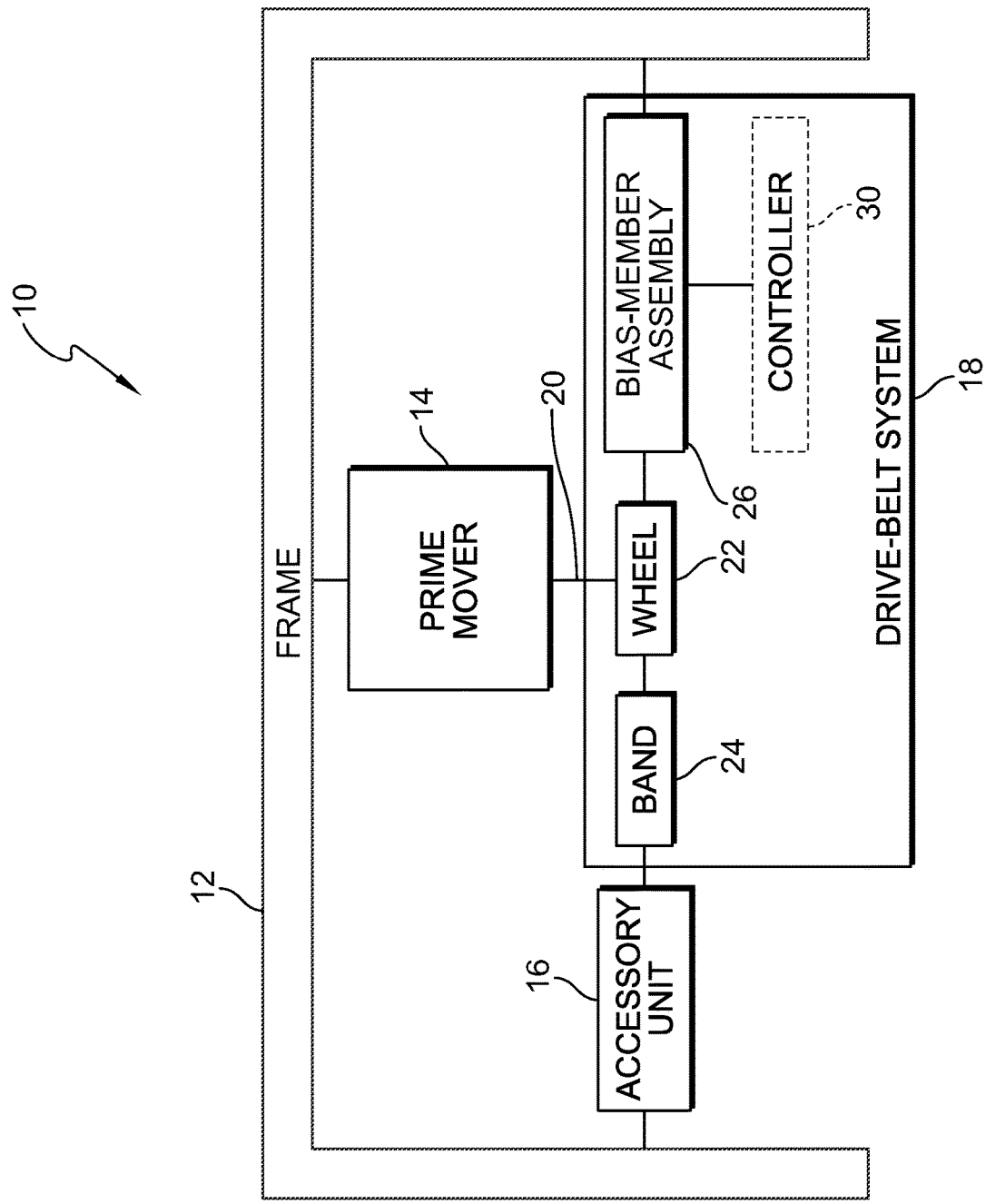
FIG. 4 is a diagrammatic view of the engine system of FIG. 2 showing that the engine system includes the frame, a prime mover such as the engine coupled to the frame, an accessory unit such as the alternator coupled to the frame, and the dive-belt system coupled to the frame and further showing that the drive-belt system includes a wheel such as the pulley, a band such as the belt, a bias-member assembly, and a controller, the wheel is coupled to a shaft of the prime mover, the band is connected to the wheel and the accessory unit, the bias-member assembly is coupled to the wheel to apply a counterforce to the wheel, and the controller is coupled to the bias-member unit to control the counterforce.

In the illustrative embodiment, the drive-belt system 18 transmits rotational motion from a crankshaft 20 included in the engine 14 to the alternator 16 as suggested in FIG. 2. The drive-belt system 18 includes a pulley 22, a belt 24, and a bias-member assembly 26 as shown in FIGS. 3 and 4. The wheel 22 is coupled with the crankshaft 20 for rotation therewith about the rotation axis 21. The belt 24 is coupled with the pulley 22 and the alternator 16 and configured to transmit the rotational motion from the pulley 22 to the alternator 16. The bias-member assembly 26 is coupled with the pulley 22 and with the frame 12 to apply a counterforce 34 to the pulley 22.

The belt 24 applies a tension force 32 to the pulley 22 for efficient and reliable power transfer as suggested in FIG. 3. The tension force 32 acts on the crankshaft 20 and may exceed a maximum force limit of the crankshaft 20. The bias-member assembly 26 is configured to apply the counterforce 34 to the pulley 22 to oppose the tension force 32 applied to the crankshaft 20 and reduce an overall net force 36 applied to the crankshaft 20. As a result, the net force 36 applied to the crankshaft 20 is less than the maximum force limit of the crankshaft 20 even though the tension force 32 may exceed the maximum force limit.

Pulley 22 and/or crankshaft 20 may be coupled to a number of systems via a plurality of belts. In such an embodiment, bias-member assembly 26 is coupled to pulley 22 and frame 12 in a configuration to reduce the net force 36 of the plurality of belts to reduce the net force 36 below the maximum force limit.

As shown in FIG. 4, the engine system 10 includes the frame 12, a prime mover 14, an accessory unit 16, and the drive-belt system 18. The frame 12 couples the prime mover 14 with the vehicle 11. In other embodiments, the frame 12 couples the prime mover 14 with a stationary structure. The accessory unit 16 provides auxiliary support for the prime mover 14 and/or the vehicle 11. The drive-belt system 18 transmits a portion of the rotational motion from the engine 14 to the accessory unit 16 to drive the accessory unit 16 and applies the counterforce 34 to the prime mover 14 to reduce the net force 36 acting on the prime mover.

The prime mover 14 includes an internal combustion engine 14 as shown in FIG. 2. In other embodiments, the prime mover 14 includes an electric motor. The prime mover 14 includes a shaft 20 that rotates about a rotation axis 21 during operation of the prime mover 14 to generate the rotational motion. In the illustrative embodiment, the shaft 20 is the crankshaft 20. In other embodiments, the shaft 20 may be an auxiliary or secondary shaft.

The accessory unit 16 includes the alternator 16 configured to provide electrical energy for engine 14 and auxiliary systems of the vehicle 11 as suggested in FIGS. 2 and 4. In other embodiments, the accessory unit 16 includes one or more of a pump, air-conditioner compressor, the alternator, and any other suitable accessory system.

The drive-belt system 18 transmits rotational motion from the shaft 20 to the accessory unit 16 as suggested in FIGS. 2 and 4. In other embodiments, the drive-belt system 18 transmits rotational motion between any pair of shafts included in the engine system 10. As such, the drive-belt system 18 is configured to transmit rotational motion between a first shaft and a second shaft included in the engine system 10.

The drive-belt system 18 includes the wheel 22, the band 24, and the bias-member assembly 26 as shown in FIG. 4. The wheel 22 is coupled to the shaft 20 of the prime mover 14 for rotation with the shaft 20. The band 24 is arranged around the wheel 22 and a portion of the accessory unit 16 to transmit rotational energy from the shaft 20 to the accessory unit 16. In some embodiments, the band 24 is arranged around an intermediate wheel that transmits the rotational energy to the accessory unit 16. The bias-member assembly 26 is configured to apply the counterforce 34 to the wheel 22 and shaft 20 to reduce or eliminate the net force 36 acting on the shaft 20.

Figure 5:
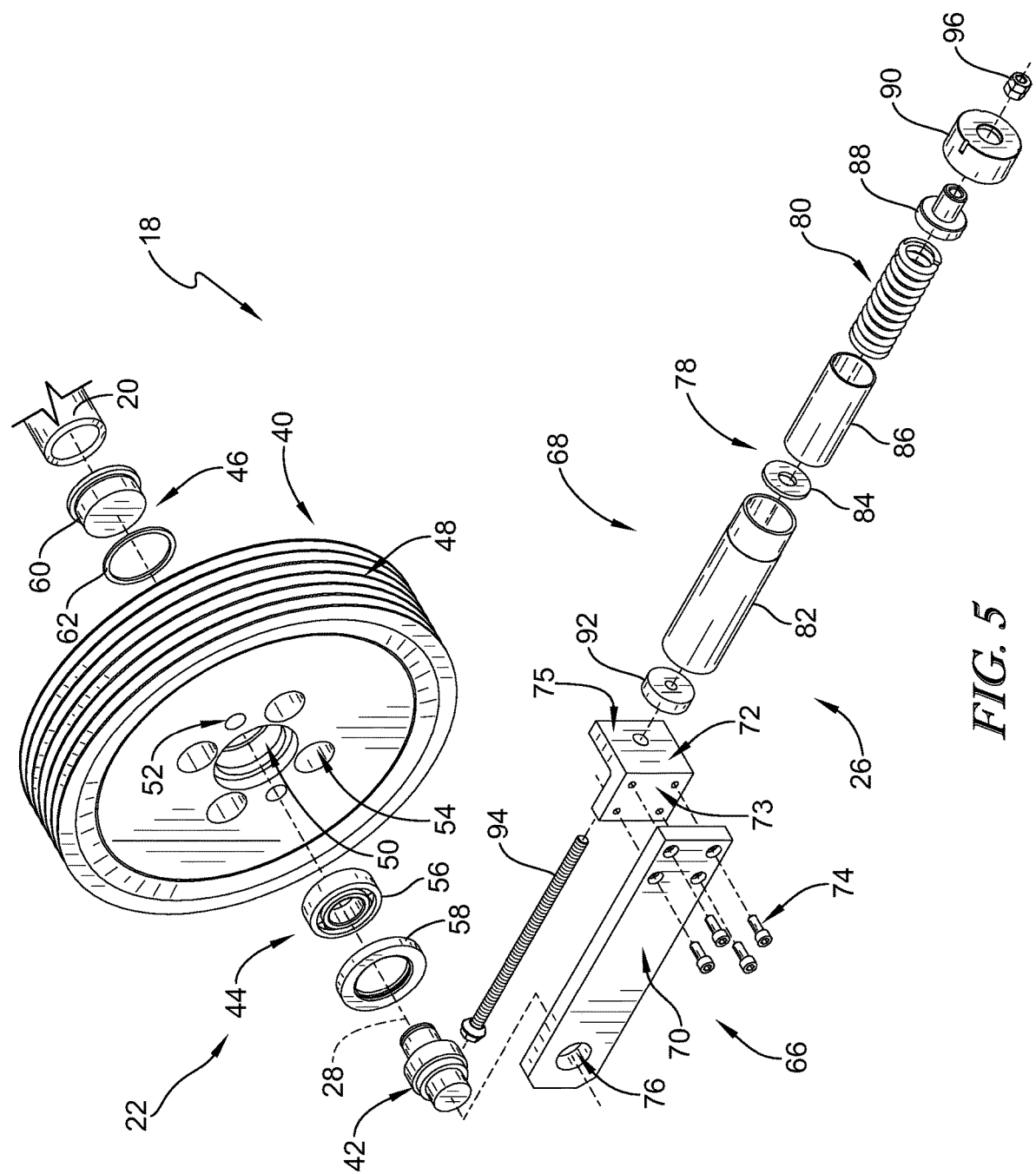
FIG. 5 is an exploded view of the drive-belt assembly of FIG. 3 showing that the drive-belt assembly includes the pulley and the bias-member assembly.
Figure 6:
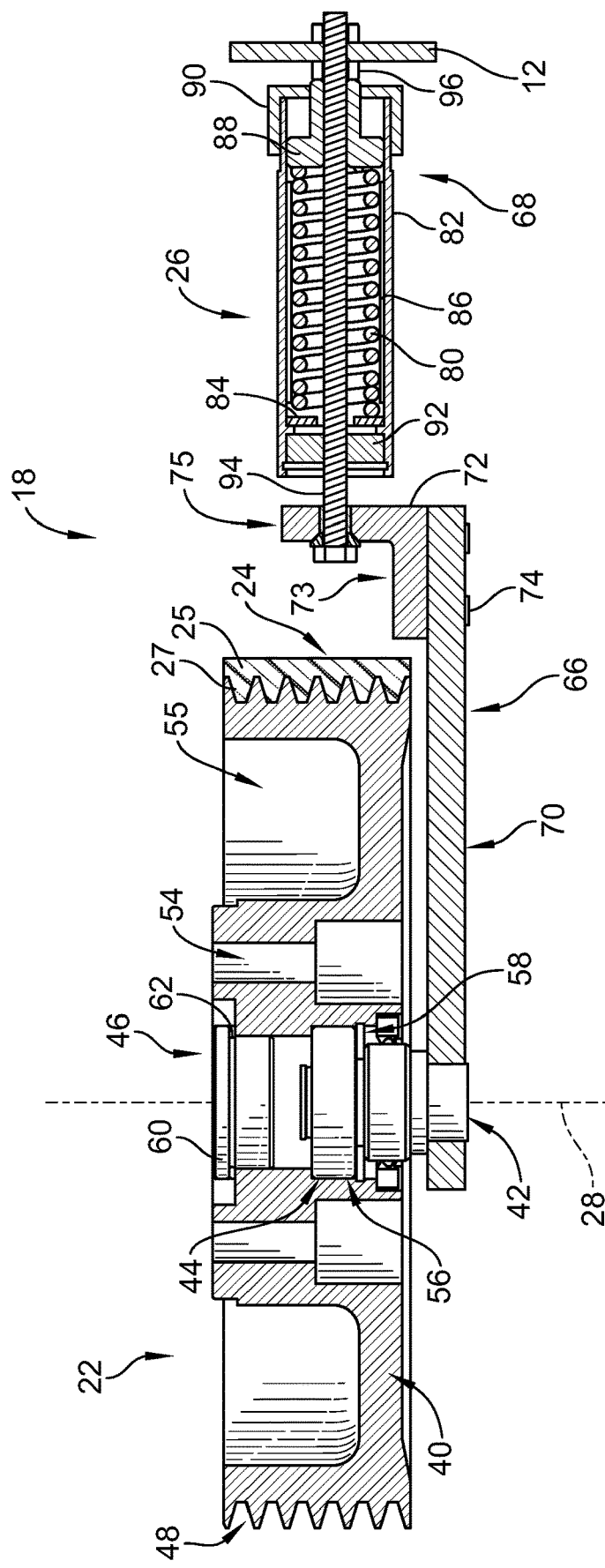
FIG. 6 is a sectional view of the drive-belt assembly of FIG. 3 showing the bias-member assembly, the pulley coupled to the bias-member assembly, and the belt arranged around the pulley.

The wheel 22 includes a wheel body 40, a guide shaft 42, a bearing unit 44, and a shaft coupler 46 as shown in FIGS. 5 and 6. The wheel body 40 is configured to rotate with the shaft 20 and transmit the rotational energy to the band 24. The guide shaft 42 couples the wheel 22 to the bias-member assembly 26 and the wheel body 40 rotates about the guide shaft 42. The bearing unit 44 reduces friction between the wheel body 40 and the guide shaft 42. The shaft coupler 46 is coupled to the wheel body 40 and the shaft 20 to couple the wheel 22 to the prime mover 14.

The wheel body 40 illustrative includes a crankshaft pulley 40 as shown in FIGS. 5 and 6. In other embodiments, the wheel body 40 includes a sprocket. The wheel body 40 is formed to include a plurality of grooves 48, a shaft-receiving aperture 50, holes 52, secondary apertures 54, and channel 55. The plurality of grooves 48 receive the band 24 to couple the band 24 to the wheel body 40. The shaft-receiving aperture 50 receives the guide shaft 42 to couple the guide shaft 42 with the wheel body 40. The holes 52 extend axially through the wheel body 40. The secondary apertures 54 extend axially through the wheel body 40 and illustratively, include counterbore holes. The channel 55 extends axially into the wheel body 40 and opens toward the prime mover 14.

The plurality of grooves 48 extend circumferentially about the wheel body 40 and extend radially inward into the wheel body 40 toward the guide shaft 42 as shown in FIGS. 5 and 6. The band 24 is configured to extend into the grooves 48 and the grooves 48 block undesirable movement of the band 24 relative to the wheel body 40.

The bearing unit 44 includes a bearing 56 and a washer 58 as shown in FIGS. 5 and 6. The bearing 56 is located in the shaft-receiving aperture 50 and is arranged around the guide shaft 42. The washer 58 is located axially between the guide shaft 42 and the bearing 56.

The shaft coupler 46 includes a socket 60 and a washer 62 as shown in FIGS. 5 and 6. The socket 60 is located in the shaft-receiving aperture 50 and receives the shaft 20 to couple the shaft 20 with the wheel body 40. The washer 62 is located axially between the socket 60 and the wheel body 40.

The band 24 is a friction belt 24 as shown in FIGS. 3 and 4. The belt 24 includes a body 25 and a plurality of v-shaped ribs 27 that extend away from the body 25 and into the grooves 48 formed in the wheel body 40. In other embodiments, the wheel 22 includes a sprocket in place of the pulley and the band 24 includes a chain 24.

The bias-member assembly 26 includes a bracket 66 and a bias member 68 as shown in FIGS. 5 and 6. The bracket 66 couples with the guide shaft 42 to couple the bias-member assembly 26 with the wheel 22. The bias member 68 is coupled to the bracket 66 and the frame 12 and applies the counterforce 34 to the wheel 22.

The bracket 66 includes a beam 70 and an L-shaped member 72 as shown in FIGS. 5 and 6. The beam 70 includes fasteners 74, a shaft aperture 76 at a first end of the beam 70 and a plurality of fastener holes 77 at a second end of the beam 70. The guide shaft 42 extends into the shaft aperture 76 to couple the guide shaft 42 with the beam 70. The L-shaped member 72 includes a first arm 73 formed to include a plurality of holes a second arm 75 formed to include a hole. The fasteners 74 extend through the beam 70 and into the holes formed in the first arm 73 of the L-shaped member 72 to couple the beam 70 with the L-shaped member 72.

The bias member 68 includes a bias element 80, an outer housing 82, a washer 84, an inner housing 86, a plunger 88, a first end cap 90, a second end cap 92, a control rod 94, and retainers 96 as shown in FIGS. 5 and 6. Bias element 80 includes a compression spring in the illustrative embodiment. In other embodiments, bias element 80 includes an air cylinder, a rubber spring, a hydraulic spring, and/or a magnetic spring.

The inner housing 86 is arranged around the bias element 80 as shown in FIG. 6. The plunger 88 engages a first end of the bias element 80. The outer housing 82 is arranged around the inner housing 86, the bias element 80, and the plunger 88. The first end cap 90 is arranged around the outer housing 82 to block access into the outer housing 82. The second end cap extends into the outer housing 82 at an end opposite of the first end cap 90 to block access into the outer housing 82. The washer 84 is located between the bias element 80 and the second end cap 92. The control rod 94 extends through the bracket 66, the bias element 80, the outer housing 82, the washer 84, the inner housing 86, the plunger 88, the first end cap 90, and the second end cap 92. The retainers 96 couple to the control rod 94 to couple the control rod 94 to the bracket 66 and block movement of components of the bias member 68. The control rod 94 and retainers 96 can be adjusted to vary the counterforce 34 produced by the bias element 80.

Figure 7:
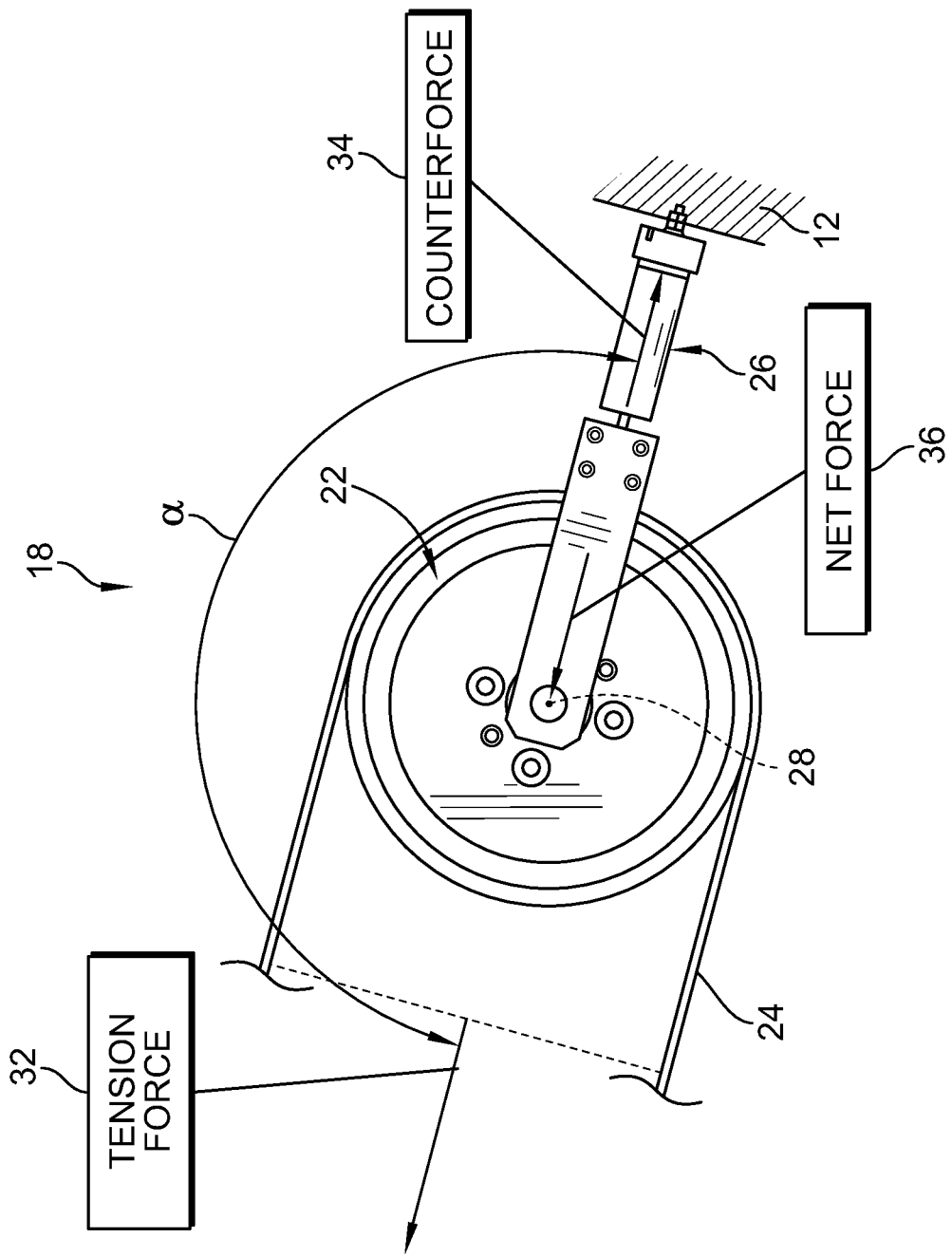
FIG. 7 is a diagrammatic view similar to FIG. 3 showing that the drive-belt system includes the pulley, the belt, and the bias-member assembly, the belt applies a belt-tension force to the pulley and the bias-member assembly applies a counterforce to the pulley to reduce a net force applied to the crank shaft of the engine.

In operation, the band 24 applies the tension force 32 to the wheel 22 to obtain efficient and reliable rotational motion transfer as suggested in FIG. 7. The rotational motion power transmission of the band 24 is a function of the tension force 32. More power demand from the accessory unit 16 results in more rotational power transmission demand and, thus, increased tension force 32 applied to the wheel 22 and shaft 20.

The shaft 20 such as, for example, the crankshaft 20 may have a maximum net force limit. The demand from the accessory unit 16 may result in a tension force 32 applied to the shaft 20 that is greater than the maximum net force limit of the shaft 20 in order to transmit the rotational motion to power the accessory unit 16. The bias-member assembly 26 applies the counterforce 34 to the wheel 22 and the shaft 20 to counteract the tension force 32 applied to the shaft 20 by the band 24 and cause the net force 36 applied to the shaft 20 to be equal to or less than the maximum net force limit of the shaft 20.

The bias-member assembly 26 is coupled to the frame 12 to cause the counterforce 34 and the tension force 32 to define an angle alpha therebetween as shown in FIG. 7. The angle alpha is illustratively about 180 degrees. In other embodiments, the angle alpha is greater than or equal to about 90 degrees. In some embodiments, the angle alpha is greater than 90 degrees.

In some embodiments, the angle alpha is greater than 90 degrees and less than 270 degrees.

In some embodiments, the controller 30 is configured to adjust the counterforce 34 applied to the shaft 20 by the drive-belt system 18. The controller 30 may adjust the counterforce 34 in response to operator input and/or in response to a change in the tension force 32.

More loads may become electrified in engine systems such as, for example, engine systems used in transit bus applications. The loads may include one relatively large load (e.g. the A/C unit) or a combination of smaller loads. The electric load on an electric machine such as, for example, an alternator or generator, of an engine system may increase the torque demanded to power the electric machine.

When the alternator or generator is driven by the engine of the vehicle using a frictional belt(s), for example a V-belt, a minimum belt tension is maintained to obtain a reliable and efficient power transfer. The belt tension produces a lateral force that is imparted on the crankshaft pulley and the crankshaft itself.

Engine manufacturers specify a maximum value for the lateral force allowed to be applied on the crankshaft. In some cases, the maximum value varies depending on the direction of the force. The maximum value of the lateral force may result in a maximum allowable belt tension applied to the frictional belt(s). The maximum allowable belt tension may translate to a maximum value of torque that can be applied to the electric machine to drive the electric machine (in the above case, the alternator).

In some embodiments, the direction of the counterforce applied by the bias member is selected to change the direction (angle) of the net radial force acting on the crank shaft so that the net radial force is within a maximum threshold for the selected direction. For example, the magnitude of the net radial force may exceed the maximum threshold for a first radial direction, but the same magnitude net radial force may be acceptable and under the maximum threshold for a second radial direction and the bias member is oriented to change the direction of the net radial force from the first direction to the second direction.

According to the present disclosure, if the lateral force applied to the crankshaft exceeds the allowable maximum limit, a counter force is established in the opposite direction in order to reduce the resultant force (sometimes called the "net force") applied to the crankshaft to below the maximum limit or, in some embodiments, to eliminate the resultant force completely. In the illustrative embodiment, a spring-loaded device is included as part of an assembly comprising the crankshaft pulley itself in order to impart a force of 1 kilonewton, for example, on the crankshaft pulley and, hence, on the crankshaft.

The maximum limit of lateral force may be a predetermined threshold. In some embodiments, the predetermined threshold is about 3 kilonewtons. As such, the bias member counters the lateral force applied by the belt and the accessory unit such that the net lateral force (radial direction relative to the rotation axis) is less than the predetermined threshold. In some embodiments, the spring cylinder body is coupled (bolted via a bracket) with the engine mount or the bus frame.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. An engine system comprising:
a frame,
a prime mover coupled with the frame for movement therewith, the prime mover including a crankshaft configured to rotate about a rotation axis,
an accessory unit adapted to be powered by the prime mover, and
a drive-belt system including a crankshaft pulley coupled with the crankshaft for rotation with the crankshaft about the rotation axis, a band coupled to the crankshaft pulley and the accessory unit, and a bias-member assembly coupled with the crankshaft pulley and with the frame,
wherein the band applies a tension force to the crankshaft pulley in a first radial direction relative to the rotation axis and the bias-member assembly applies a counterforce to the crankshaft pulley in a second radial direction relative to the rotation axis and the second radial direction is different than the first radial direction.

2. The engine system of claim 1, wherein the tension force applied by the crankshaft pulley and the counterforce applied by the bias-member assembly amount to a radial net force to the crankshaft pulley and a magnitude of the counterforce and an orientation of the second radial direction are configured such that the radial net force is less than the tension force.

3. The engine system of claim 2, wherein the tension force is greater than a predetermined threshold, the radial net force is less than the predetermined threshold, and the predetermined threshold is about 3 kilonewtons.

4. The engine system of claim 1, wherein the first radial direction and the second radial direction define an angle alpha therebetween and the angle alpha is greater than about 90 degrees.

5. The engine system of claim 1, wherein the bias-member assembly includes at least one of an air cylinder, a rubber spring, a hydraulic spring, a magnetic spring, and a compression spring.

6. The engine system of claim 5, wherein the crankshaft pulley includes a guide shaft that extends along the rotation axis and a wheel body configured to rotate relative to the guide shaft, and the bias-member assembly includes a bracket coupled with the guide shaft and a bias member coupled with the bracket and the frame.

7. The engine system of claim 6, wherein the bracket includes a first wall and a second wall that extends away from the first wall such that the bracket is L-shaped, the first wall is coupled with the guide shaft, and the second wall is coupled with the bias member.

8. The engine system of claim 1, wherein the crankshaft pulley includes a sprocket and the band includes a chain arranged around the sprocket.

9. An engine system comprising:
a drive-belt system that includes:
a crankshaft pulley configured to be coupled with a crankshaft of an engine for rotation with the crankshaft about a rotation axis and
a bias-member assembly coupled with the crankshaft pulley, the bias-member assembly configured to apply a radial counterforce to the crankshaft pulley relative to the rotation axis.

10. The engine system of claim 9, further comprising a belt arranged around the crankshaft pulley and configured to apply a radial tension force to the crankshaft pulley.

11. The engine system of claim 9, wherein the bias-member assembly includes at least one of an air cylinder, a rubber spring, a hydraulic spring, a magnetic spring, and a compression spring.

12. The engine system of claim 9, wherein the crankshaft pulley includes a guide shaft that extends along the rotation axis and a wheel body configured to rotate relative to the guide shaft and the bias-member assembly includes a bracket coupled with the guide shaft and a bias member coupled with the bracket.

13. The engine system of claim 12, wherein the bracket includes a first wall and a second wall that extends away from the first wall such that the bracket is L-shaped, the first wall is coupled with the guide shaft, and the second wall is coupled with the bias member.

14. A method comprising:
providing a frame, a prime mover having a crankshaft configured to rotate about a rotation axis, and a drive-belt system including a wheel and a bias-member assembly,
coupling the prime mover with the frame for movement therewith,
coupling the wheel with the crankshaft for rotation with the crankshaft about the rotation axis, and
coupling the bias-member assembly with the wheel and with the frame to cause the bias-member assembly to apply a first radial force to the wheel in a first direction.

15. The method of claim 14, further comprising applying a second radial force to the wheel in a second direction to cause a radial net force applied to the wheel to be less than each of the first radial force and the second radial force.

16. The method of claim 15, wherein the bias-member assembly includes at least one of an air cylinder, a rubber spring, a hydraulic spring, a magnetic spring, and a compression spring.

17. The method of claim 16, further comprising varying the first radial force applied to the wheel.

18. The method of claim 15, wherein the first radial force and the second radial force define an angle therebetween and the angle is greater than 90 degrees.

\* \* \* \* \*